US010005615B1

(12) United States Patent
Matson

(10) Patent No.: US 10,005,615 B1
(45) Date of Patent: Jun. 26, 2018

(54) FLIGHTS AND FASTENERS FOR COMPACT-GRID CONVEYOR BELTS

(71) Applicant: WIRE BELT COMPANY OF AMERICA, INC., Londonderry, NH (US)

(72) Inventor: Matthew Matson, Bedford, NH (US)

(73) Assignee: Wire Belt Company of America, Inc., Londonderry, NH (US)

(*) Notice: Subject to any disclaimer, the term of this patent is extended or adjusted under 35 U.S.C. 154(b) by 0 days. days.

(21) Appl. No.: 15/387,753

(22) Filed: Dec. 22, 2016

(51) Int. Cl.
B65G 17/12 (2006.01)

(52) U.S. Cl.
CPC .................................. B65G 17/12 (2013.01)

(58) Field of Classification Search
CPC ........................................................ B65G 17/12
USPC ........................................................... 198/698
See application file for complete search history.

(56) References Cited

U.S. PATENT DOCUMENTS

| | | | | |
|---|---|---|---|---|
| 2,290,456 A * | 7/1942 | Stilwell | ................... | B65G 17/32 198/525 |
| 2,461,150 A * | 2/1949 | Flynn | ..................... | B62D 55/24 198/698 |
| 2,870,900 A * | 1/1959 | Will | ....................... | B65G 17/12 198/535 |
| 3,734,269 A * | 5/1973 | Ross | ...................... | A01D 33/08 198/698 |
| 4,310,088 A * | 1/1982 | Tibbals | ................ | B65G 47/082 198/419.1 |
| 4,865,182 A * | 9/1989 | Nolte | ..................... | B65G 15/42 198/698 |
| 6,142,290 A * | 11/2000 | Tagliaferri | ............. | B65G 15/52 198/699 |
| 6,158,577 A * | 12/2000 | Tjabringa | ............... | A01D 17/10 198/698 |
| 6,554,129 B2 * | 4/2003 | Straight | .................. | B65G 17/08 198/698 |
| 7,775,345 B2 * | 8/2010 | Fourney | .................. | B65G 17/24 198/779 |
| 8,365,900 B2 * | 2/2013 | Monti | .................... | B65G 17/44 198/698 |
| 8,678,232 B2 * | 3/2014 | Mockus | .................. | G07F 11/00 198/698 |
| 9,856,086 B2 * | 1/2018 | Oord | ....................... | B65G 17/32 |
| 2004/0238329 A1 * | 12/2004 | Verdigets | ............... | B65G 17/08 198/698 |
| 2006/0207862 A1 * | 9/2006 | Costanzo | ............... | B65G 17/24 198/698 |
| 2007/0056828 A1 * | 3/2007 | Zemlin | ................... | B65G 17/12 198/397.01 |
| 2011/0127144 A1 * | 6/2011 | Krischer | ................ | B65G 17/44 198/698 |
| 2011/0220465 A1 * | 9/2011 | Monti | .................... | B65G 15/44 198/698 |
| 2015/0284188 A1 * | 10/2015 | Voigt | ..................... | B65G 17/34 198/867.01 |

(Continued)

Primary Examiner — Joseph Dillon, Jr.
(74) Attorney, Agent, or Firm — Davis & Bujold, P.L.L.C.; Kimberly A. W. Peaslee

(57) ABSTRACT

The system and method for using flights and fasteners with compact-grid conveyor belts. The J-fasteners of rivet-type fasteners secure angled and vented metal flights to compact-grid conveyor belts. The fasteners attach a flight via embossed areas spaced to avoid guide and drive pulleys. Specially adapted sprockets are also used to accommodate the attachment of flights using fasteners.

5 Claims, 11 Drawing Sheets

(56) References Cited

U.S. PATENT DOCUMENTS

2018/0031076 A1* 2/2018 Blase .................. F16G 13/16

* cited by examiner

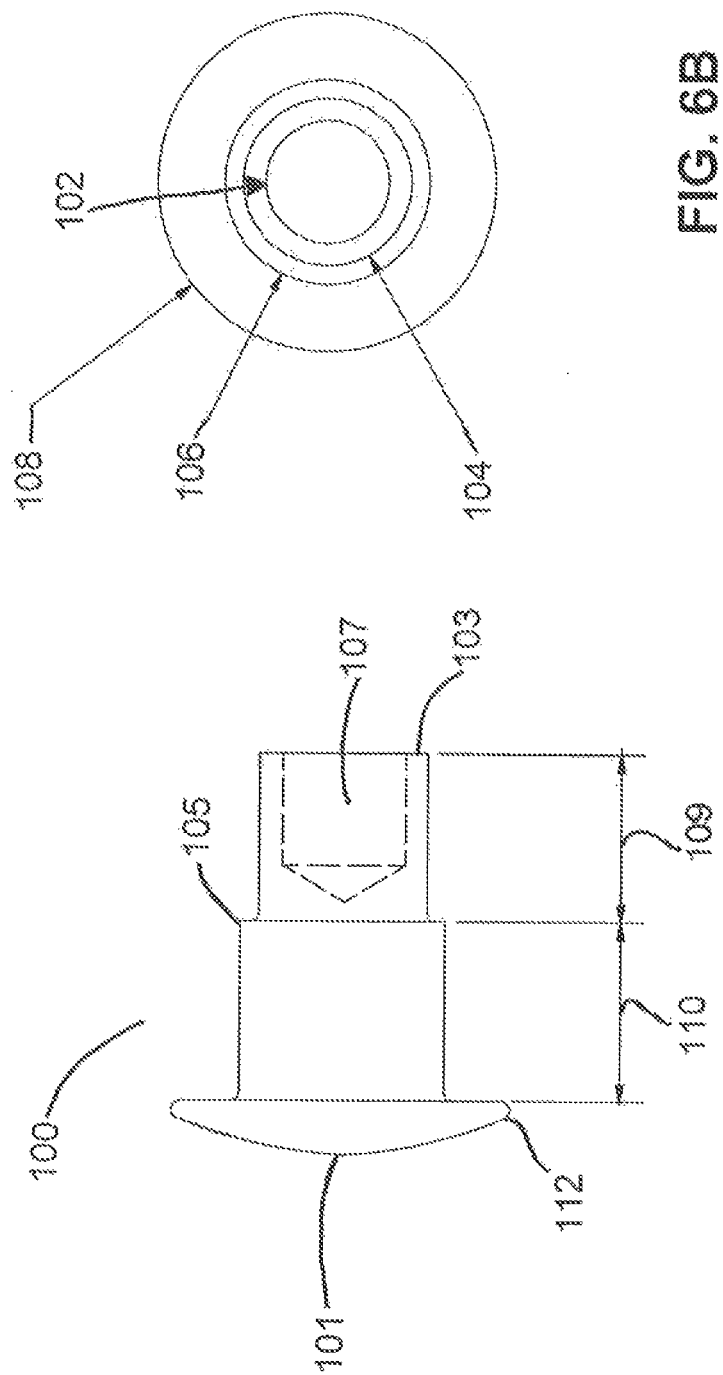

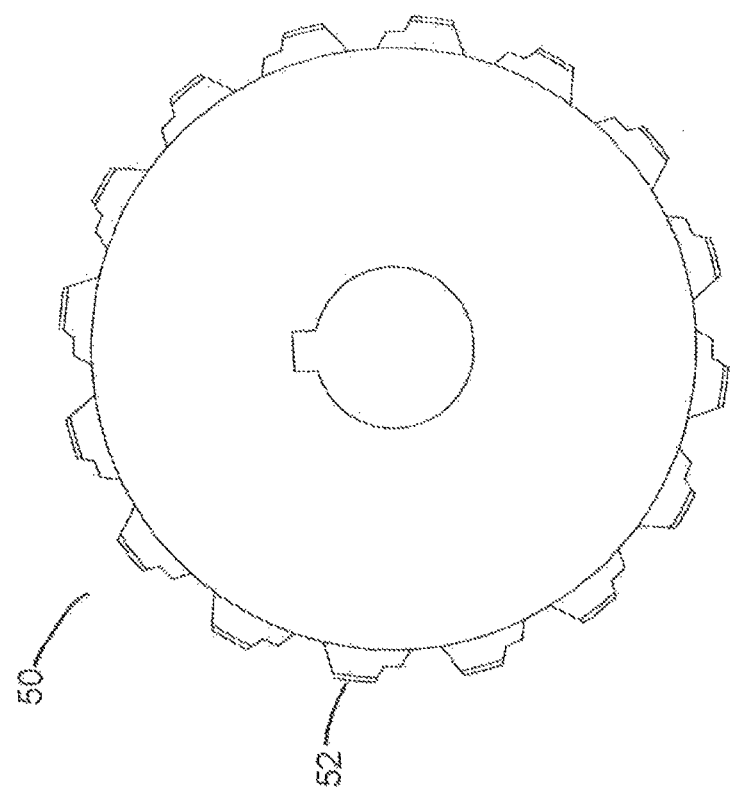
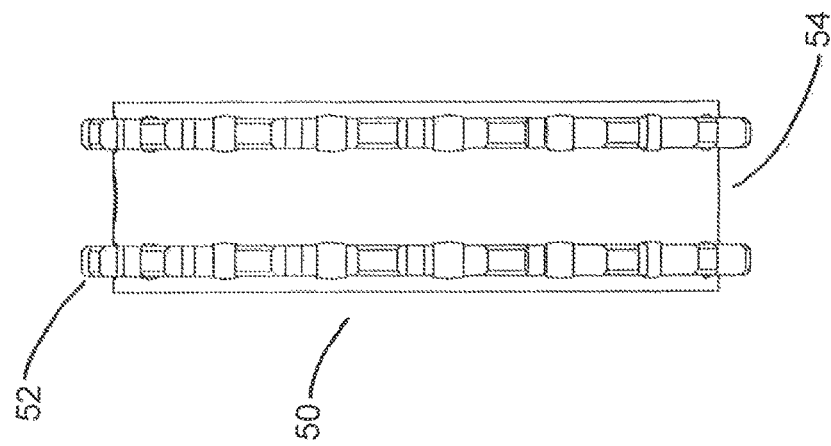

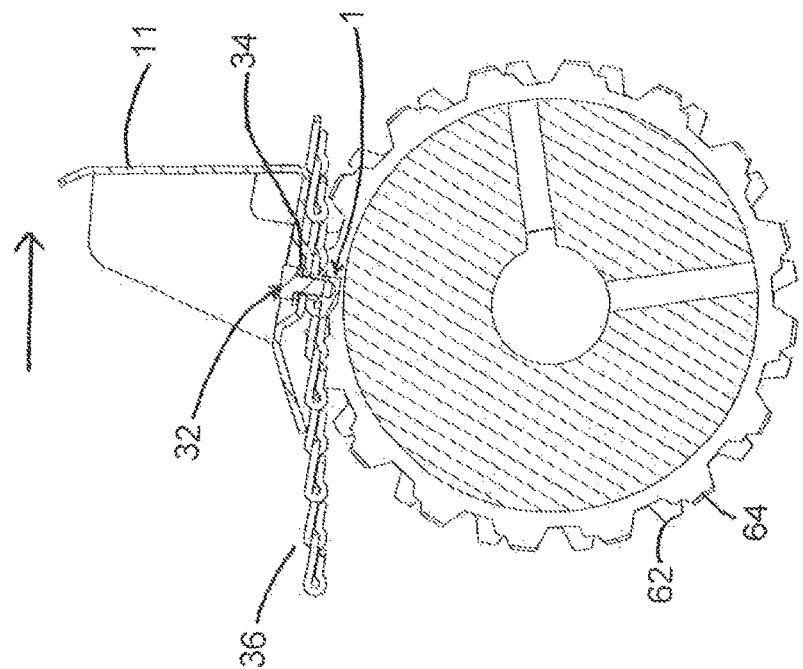
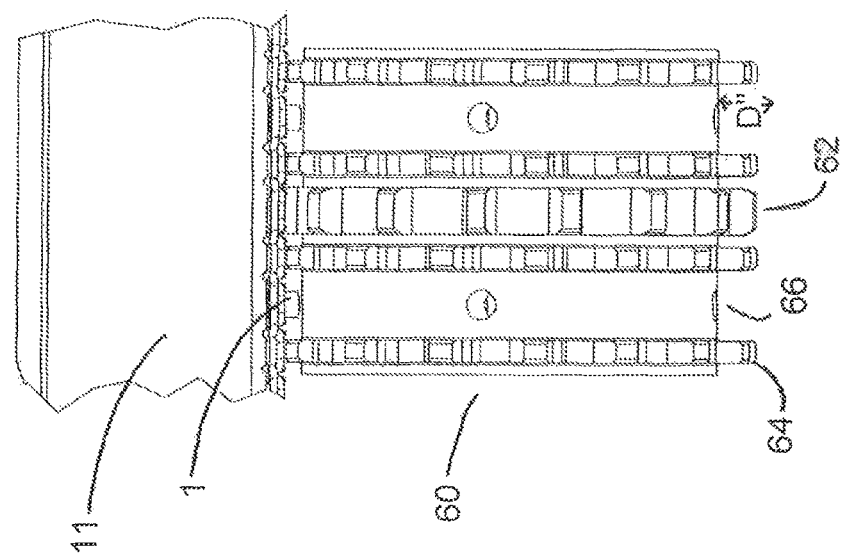
FIG. 8B
FIG. 8A

FLIGHTS AND FASTENERS FOR COMPACT-GRID CONVEYOR BELTS

FIELD OF THE DISCLOSURE

The present disclosure relates to compact-grid conveyor belts and, more particularly, to a method and system of using flights and fasteners with compact-grid conveyor belts.

BACKGROUND OF THE DISCLOSURE

Wire belts are commonly used for conveying articles during cooling, drying, coating, cooking, and many other applications. In one particular application, wire belts are used to convey food articles during the cooking or the processing of food. Wire belts are particularly advantageous for food processing because they can provide an open flow through mesh, a high degree of flexibility, a sanitary construction, simple installation and maintenance, and the ability to be positively driven. A wire belt typically includes a plurality of wire links interlocked or joined together to form an endless conveyor belt. Wire belts typically require a splice connection between the wire links of opposite ends of a wire belt to join the opposed ends together and form an endless conveyor belt.

The known close mesh or weave style belts include a plurality of individual wires which are woven around each other or a cross rod to form a generally flat surface. While these close mesh or weave style belts are capable of very small mesh sizes and have a relatively high strength, they have a very low percent open area making them undesirable for a number of applications, e.g., applications requiring heating, cooling, airflow, and draining. Moreover, these known belts utilize a considerable amount of wire per length of wire belt. This is undesirable in heating and cooling applications because a substantial amount of energy will be wasted in heating and/or cooling the belt itself rather than heating and/or cooling the objects being transported. Because of the complex weaving and the amount of material used, the known close weave or mesh belts are also expensive and time consuming to manufacture.

Another problem with the known close mesh or weave style belts is the difficulty in cleaning the belts. In the Food Processing Industry, it is critical to properly clean and sanitize the belt in order to produce wholesome food products free from physical and/or bacterial contamination that comply with USDA & FDA regulations. Because of the small percent open area and the numerous bends and overlaps formed by the wires, food and contaminants are often difficult to remove making cleaning and sterilizing extremely difficult. As a result, belts of this design are often not suited for many food applications.

Typical flighted conveyor belts are made of plastic and thus present additional problems. One problem with plastic belts is that while they are generally flexible and lightweight, they are difficult to clean. Another problem with plastic conveyor belts is that they can break down over time. One source of "extraneous material" found in food products is plastic.

The fasteners and flights of the present disclosure work with metal compact-grid conveyor belts which feature a plurality of interconnected links that form a wire belt having a small mesh size, large percent open-area, and high strength, without the use of transverse rods or complex weaving patterns. The compact-grid wire belt includes a hinge portion sized and shaped to rotatably interconnect with a region of a hanger portion such that a first link will rotate or bend relative to an adjacent link. A hanger portion preferably includes a substantially horizontal section and may form a "W" shape, or other shape to help orient and stabilize the hinge portion.

SUMMARY OF THE DISCLOSURE

Wherefore it is an object of the present disclosure to overcome the above-mentioned shortcomings and drawbacks associated with the prior art flights and fasteners.

One aspect of the present disclosure is a fastening system for flights for use with compact-grid conveyor belts comprising, a J-fastener comprising, a base region having an internal threaded bore for accepting a screw and an outer circumference, wherein the base region contacts a flight at a belt contacting surface when used to attach a flight to a compact-grid conveyor belt; a head region having a bottom surface, wherein the bottom surface protrudes outwardly away from the outer circumference of the base region to form a fastener that resembles a "J" when viewed in profile; and a junction with about a 90 degree angle where the base region and the head region meet as defined by the bottom surface of the head portion and the outer circumference of the base, the junction contacting a hinge portion of a compact-grid conveyor belt when used to attach the flight to the compact-grid conveyor belt; a flight, comprising a base defining a plane and having a leading edge and an opposing trailing edge, where the leading and trailing edges are spaced apart and have alternating through holes and embossed areas positioned therebetween along a width of the flight as defined by a first side and a second side; and a product contacting portion extending upward from the leading edge; each of the embossed areas extending downward out of the plane of the base to provide a fastener attachment point therein for attaching the flight to a compact-grid conveyor belt.

One embodiment of the fastening system is wherein the junction is rounded to allow for rotation around the hinge portion of a wire in a compact-grid wire belt when attached to the compact-grid wire belt. In some cases, the extent that the head region protrudes outwardly away from the outer circumference of the base is about equal to the extent that the base region protrudes down from the bottom surface of the head region.

In some embodiments, the fastening system further comprises an angled foot portion extending out and down with respect to the trailing edge of the plane of the base. In some cases, the fastening system further comprises a pair of side panels linking the product contacting portion to the base at the first side and at the second side. The flight may further comprise side vents located where the base, side panels, and product contacting portion meet.

In another embodiment, the product contacting surface has a top edge that is angled in the direction of the trailing edge. In yet another embodiment, the product contacting surface has a top edge that is angled in the direction of the leading edge to form a cupped flight.

Another aspect of the present disclosure is a fastening system for flights for use with compact-grid conveyor belts comprising, a flight, comprising a base defining a plane and having a leading edge and an opposing trailing edge, where the leading and trailing edges are spaced apart and have alternating through holes and embossed areas positioned therebetween along a width of the flight as defined by a first side and a second side; a product contacting portion extending upward from the leading edge; an angled foot portion extending out and down with respect to the trailing edge of the plane of the base; and a pair of side panels linking the product contacting portion to the base at the first side and at the second side; each of the embossed areas extending downward out of the plane of the base to provide a fastener attachment point therein for attaching the flight to a compact-grid conveyor belt, the compact-grid conveyor belt having a plurality of hinge portions and a plurality of hanger portions, where the hanger portions on a first wire engage with hinge portions of an adjacent wire to form a plurality of links in the compact-grid conveyor belt; and a rivet-type fastener comprising, a tail end being deformable to create a rivet for attaching the flight to the compact-grid conveyor belt; a first portion having a first outer diameter extending from the first end to a second portion, where the first portion is sized to fit through the fastener attachment point of the flight; the second portion having a second outer diameter being located between the first portion and a head end, where the second portion is sized to fit through one of the plurality of links in the compact-grid conveyor belt, but not through the fastener attachment point of the flight; and a head end having a third outer diameter, wherein the third outer diameter is larger than a space defined by one of the plurality of links in the compact-grid conveyor belt.

One embodiment of the fastening system is wherein the product contacting surface has a top edge that is angled in the direction of the trailing edge. In some cases, the product contacting surface has a top edge that is angled in the direction of the leading edge to form a cupped flight.

In another embodiment of the fastening system, the flight further comprises side vents located where the base, side panels, and product contacting portion meet. In some cases, the angled foot portion is angled downwardly away from the plane defining the base.

Yet another aspect of the present disclosure is a method of attaching flights to a compact-grid conveyor belt comprising, providing a compact-grid conveyor belt having a plurality of hinge portions and a plurality of hanger portions, where the hanger portions on a first wire engage with hinge portions of an adjacent wire to form a plurality of links in a compact-grid conveyor belt; providing a plurality of flights comprising a base defining a plane and having a leading edge and an opposing trailing edge, where the leading and trailing edges are spaced apart and have alternating through holes and embossed areas positioned therebetween along a width of the flight as defined by a first side and a second side; a product contacting portion extending upward from the leading edge; an angled foot portion extending out and down with respect to the trailing edge of the plane of the base; a pair of side panels linking the product contacting portion to the base at the first side and at the second side; and each of the embossed areas extending downward out of the plane of the base to provide a fastener attachment point therein for attaching the flight to a compact-grid conveyor belt; providing a plurality of fasteners; providing a plurality of drive sprockets comprising, two or more rows of teeth positioned around the circumference of the sprocket and spaced apart defining a groove between the rows of teeth sized to accommodate fasteners; fastening the plurality of flights to the compact-grid conveyor belt using a fastener; and spacing the embossed areas along the width of the flight is such that the fasteners are aligned with the groove in the drive sprocket.

One embodiment of the method of attaching flights to a compact-grid conveyor is wherein the fastener is a J-fastener comprising, a base region having an internal threaded bore for accepting a screw and an outer circumference, wherein the base region contacts a flight at a belt contacting surface when used to attach a flight to a compact-grid conveyor belt; a head region having a bottom surface, wherein the bottom surface protrudes outwardly away from the outer circumference of the base region to form a fastener that resembles a "J" when viewed in profile; and a junction with about a 90 degree angle where the base region and the head region meet as defined by the bottom surface of the head portion and the outer circumference of the base, the junction contacting a hinge portion of a compact-grid conveyor belt when used to attach the flight to the compact-grid conveyor belt.

One embodiment of the method of attaching flights to a compact-grid conveyor is wherein fastening the plurality of flights to the compact-grid conveyor belt using a fastener comprises using a screw and a spring washer at each fastener attachment point in the embossed areas, wherein the J-fastener attaches to the compact-grid conveyor belt such that the junction clamps down on the hinge portion of a wire, the outer circumference of the J-fastener base is bounded by a hanger portion of an adjacent wire, and the belt contacting surface of each embossed area contacts the hanger portion of the adjacent wire in the compact-grid conveyor belt to provide for ease of cleaning and flexibility.

In some cases, the method of attaching flights to a compact-grid conveyor belt is wherein the fastener is a rivet-type fastener comprising, a tail end being deformable to create a rivet for attaching the flight to the compact-grid conveyor belt; a first portion having a first outer diameter extending from the first end to a second portion, where the first portion is sized to fit through the fastener attachment point of the flight; the second portion having a second outer diameter being located between the first portion and a head end, where the second portion is sized to fit through one of the plurality of links in the compact-grid conveyor belt, but not through the fastener attachment point of the flight; and a head end having a third outer diameter, wherein the third outer diameter is larger than a space defined by one of the plurality of links in the compact-grid conveyor belt.

In some cases, the product contacting surface has a top edge that is angled in the direction of the trailing edge. In other cases, the product contacting surface has a top edge that is angled in the direction of the leading edge to form a cupped flight.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

FIG. 6A shows a side view of another embodiment of a fastener of the present disclosure.

FIG. 6B shows a bottom view of the rivet-type fastener of the present disclosure as shown in FIG. 6A.

FIG. 7A shows a front view of a prior art drive sprocket.

FIG. 7B shows a side view of a prior art drive sprocket.

FIG. 8A shows a front view of one embodiment of a drive sprocket of the present disclosure.

FIG. 8B shows a side view of one embodiment of a drive sprocket of the present disclosure with one embodiment of the flight and J-fastener of the present disclosure.

DETAILED DESCRIPTION OF THE DISCLOSURE

The system and method of using flights and fasteners with compact-grid conveyor belts of the present disclosure offers flexibility in configuration. This system is easy to clean in place and is manufactured from metal, preferable sanitized stainless steel. The flights and fasteners of the present disclosure also hold up well during challenging conditions and can easily replace flighted plastic conveyor systems which are currently in use.

In certain embodiments, the flight widths are customizable to accommodate a variety of applications. The flights and fasteners can operate in extreme temperature environments where plastic flights cannot be used. The compact-grid conveyor belt flights provide multiple fastening sites to assure integrity during use. In some embodiments, the fasteners are designed for strength and holding power and are near impossible to remove in the field. Some embodiments of the fasteners described herein can be torqued to a specific tension and, in some cases, are held in place with food grade FDA-approved thread locking compound. Other embodiments of the fasteners described herein are of the rivet-type and are deformed when installed.

One embodiment of the fasteners of the present disclosure has a special "J" hook configuration. Another embodiment of the fasteners of the present disclosure is a rivet-type fastener having a head portion and a tail portion that may be deformed when installed. The flights of the present disclosure are designed to accommodate the various fasteners to allow perfect tracking on the positive drive. In some cases, the fasteners are machined from steel. In certain embodiments, the steel is austenitic stainless steel from the 300 series.

The compact-grid system of flights and fasteners are designed to be easily cleaned. The fasteners are spaced and gapped to allow for high-pressure spray nozzle cleaning. In certain embodiments, the flights are designed with through holes and side vents to allow hygienic drainage and drying after cleaning and sanitizing. Additionally, in some cases the flights are mounted to allow for flexibility in the direction of travel. In some cases, the angled flight design eliminates the possibility of food product entrapment under the edges of the flight by providing minimal contacts with the conveyor belt.

Figure 1A:
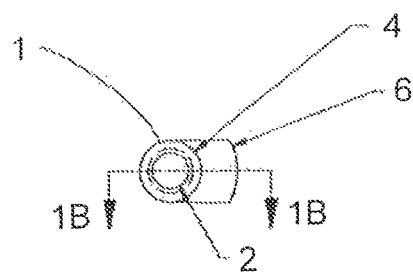
FIG. 1A shows a bottom view of one embodiment of a J-fastener of the present disclosure.

Referring to FIG. 1A, a bottom view of one embodiment of a J-fastener of the present disclosure is shown. More particularly, a J-fastener 1 is shown with a base having an inner diameter 2 and an outer diameter 4. In certain embodiments, the J-fastener 1 is formed of 300 series stainless steel. A head portion 6 extends outwardly from the base to form a "J" when viewed in profile (See, FIG. 1B). As seen in FIG. 1A, some embodiments of the head portion 6 are rounded when viewed from below.

Figure 1B:
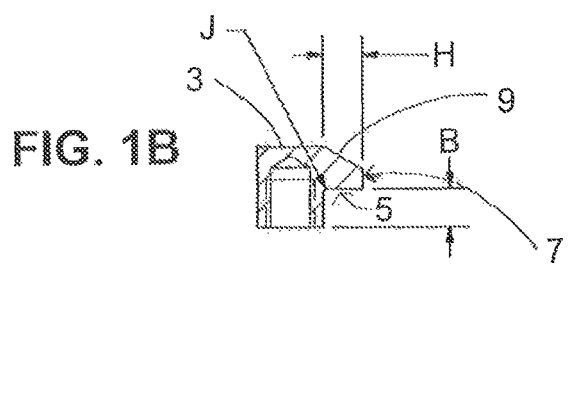
FIG. 1B shows a cross-sectional view along line 1B-1B in FIG. 1A of one embodiment of a J-fastener of the present disclosure.

FIG. 1B shows a cross-sectional view along line 1B-1B in FIG. 1A for one embodiment of a J-fastener of the present disclosure. More particularly, the J-fastener 1 is proportioned such that the extent that the head portion 6 protrudes away from a base (H) is about equal to the extent that the base protrudes down from the bottom surface of the head portion (B). In some cases, this is about 3.25 mm. In certain embodiments, the junction J where the head portion extends out from the base portion is rounded to better accommodate the wire of the compact-grid conveyor belt. The head portion typically comprises a top surface 3, a bottom surface 5, an angled portion 9, and a flat face 7. In some cases, there is a chamfered portion on the head of the J-fastener located on the leading side of the head of the fastener when installed on a compact-grid conveyor belt (not shown).

Figure 1C:
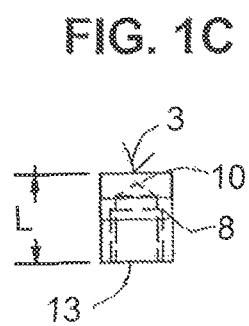
FIG. 1C shows a front cut-away view of one embodiment of a J-fastener of the present disclosure.

FIG. 1C shows a front cut-away view of FIG. 1A. More particularly, a threaded internal portion 8 does not always extend the entire distance L from the top surface of the J-fastener 3 to the bottom end of the base 13 of the J-fastener. In some embodiments, an internal bore 10 extends beyond the internal threaded portion. The extended bore is used to facilitate the threading of a blind hole. This is done for manufacturability but the internal bore can also be fully threaded. The entire distance L is about 6.75 mm in certain embodiments of the fastener of the present disclosure. In certain embodiments, the J-fastener is designed to function with compact-grid meshes of about ⅜" or 10 mm. In other embodiments, the J-fastener is sized to function with other mesh sizes.

Figure 2A:
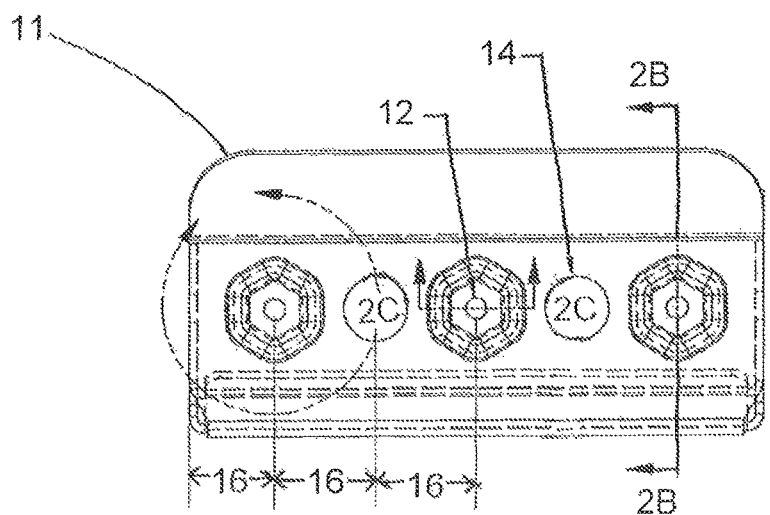
FIG. 2A is a bottom view of one embodiment of a flight of the present disclosure.

Referring to FIG. 2A, a bottom view of one embodiment of a flight of the present disclosure is shown. More particularly, a flight 11 has a plurality of fastener attachment points 12 and a plurality of through holes 14. The through holes 14 facilitate cleaning of the conveyor belt and also reduce the weight of the flight 11. The fastener attachment points 12 provide discrete attachment points for the fasteners (not shown in this figure). In certain embodiments, the fastener attachment points 12 alternate with the through holes 14 along the width of the flight. The center to center spacing 16 of fastener attachment points are designed such that they will not coincide with drive teeth or guide teeth of the conveyor belt system which is discussed below in further detail. In certain embodiments, the measurement from the center of a fastener attachment point to the center of the adjacent through hole is about 20 mm. In certain embodiments, the measurement from the center of a first fastener attachment point to the center of a second fastener attachment point is about 40 mm. Other configurations and center to center spacing is contemplated by the present disclosure.

Figure 2B:
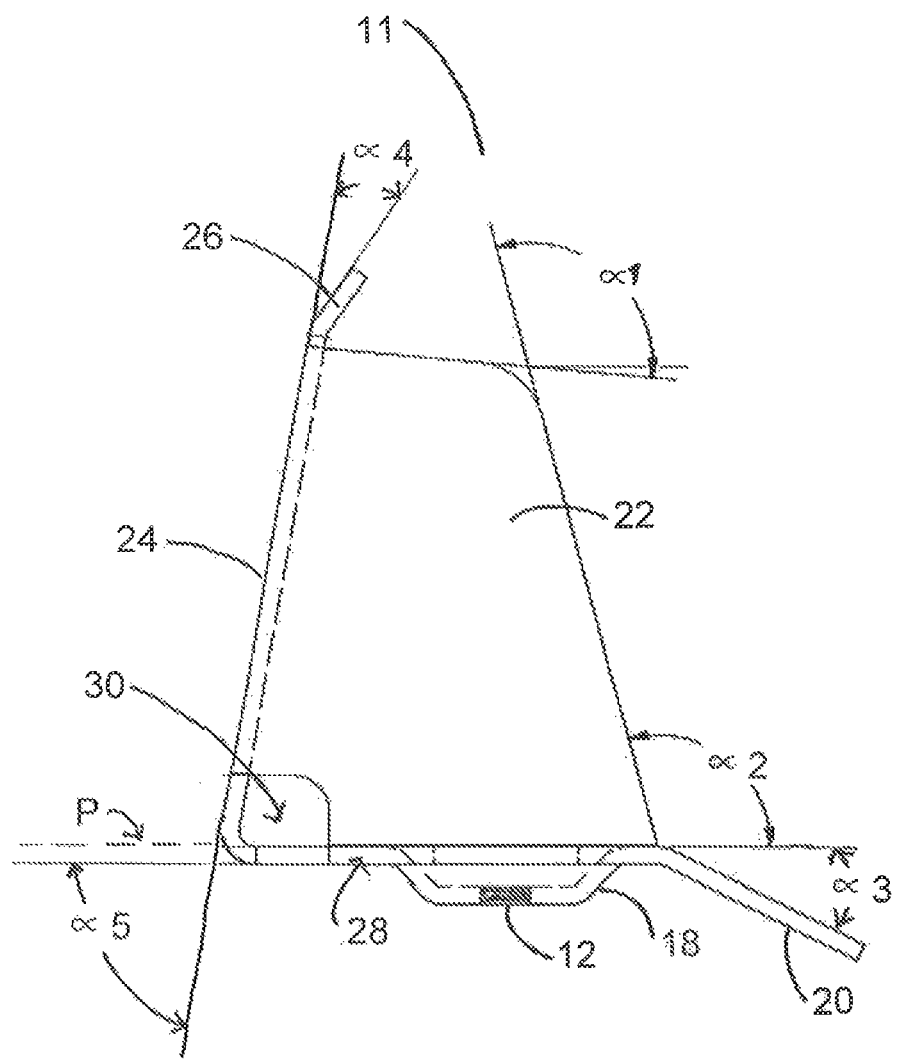
FIG. 2B shows a cross-sectional view along line 2B-2B in FIG. 2A for one embodiment of a flight of the present disclosure.

FIG. 2B shows a cross-sectional view along line 2B-2B in FIG. 2A. More particularly, one embodiment of a flight according to the principles of the present disclosure is designed with a foot portion 20 that is angled with respect to a plane P from which a plurality of embossed areas 18 extend/depress (see, FIG. 2D). This plane P is also referred to as the base 28 of the flight. A fastener attachment point 12 is located in the center of each embossed area 18. The flight 11 typically has a food contacting portion 24 which is designed to be in contact with the food product being transported or processed and a side portion 22 (see, FIG. 2D). The side portion adds stability to the flight 11. The side portion 22 typically has a cut-away or vent section 30 in the area where the food contacting portion 24 and the base 28 meet. The angle at which the food contacting portion and the base meet $\alpha^5$ is generally about 80 degrees or so, but this angle may vary. In certain embodiments, a region on the top 26 of the food contacting portion 24 of the flight 11 is angled toward the foot, or trailing side, of the flight 11 by angle $\alpha^4$. This top angled portion 26 provides added stability to the flight. A top edge and a trailing edge of the side panel 22 meet with each other at a rounded corner. The two edges are generally at an angle, $\alpha^1$, which can be about 110 degrees with respect to each other, but this angle may vary. The cut-away, or vent, portion 30 may be rounded and be about 6.35 mm tall and about 6.35 mm wide. In some cases, the trailing edge of the side panel 22 is at an angle, $\alpha^2$, about a 105 degree angle with respect to the plane of the base, but this angle may also vary. In some embodiments, the angled foot portion 20 forms an angle, $\alpha^3$, of about 26 degrees with respect to the plane P of the base 28. A range of angles may be used for the angled foot portion so long as it creates minimum contact between the flight and the compact-grid conveyor belt and thus facilitates cleaning of the flighted belt. See, for example, FIG. 3A, FIG. 3B and FIG. 6C.

Figure 2C:
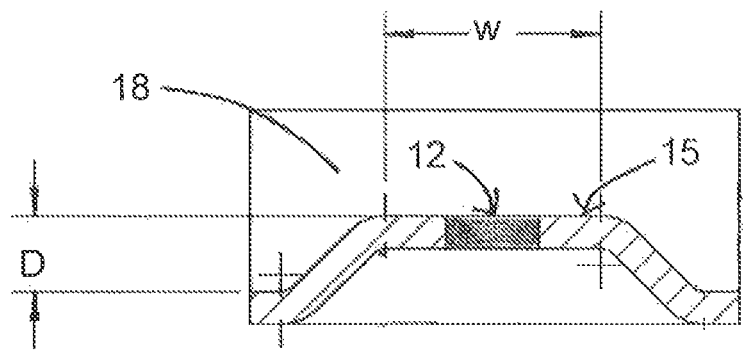
FIG. 2C shows a cross-sectional view along line 2C-2C in FIG. 2A for one embodiment of a flight of the present disclosure.

FIG. 2C shows a side view along line 2C-2C in FIG. 2A for one embodiment of a flight of the present disclosure. More particularly, a fastener attachment point 12 is located in the center of each embossed area 18. In this embodiment, the depression depth D of the embossed area is about 3.5 mm and the depression width W of the embossed area 18 is about 10 mm. The embossed area has a wire belt contacting surface 15. The embossed area protrudes below the plane P of the base (See, for example, FIG. 3B) to accommodate attachment of a fastener, for example, with a bolt or screw used to attach the J-fastener to the flight 11 or to accommodate the rivet-type fastener to join the flight 11 to a compact-grid conveyor belt. In some cases, the embossed area 18 is hexagonal in shape. In it understood that other shapes are also contemplated herein.

Figure 2D:
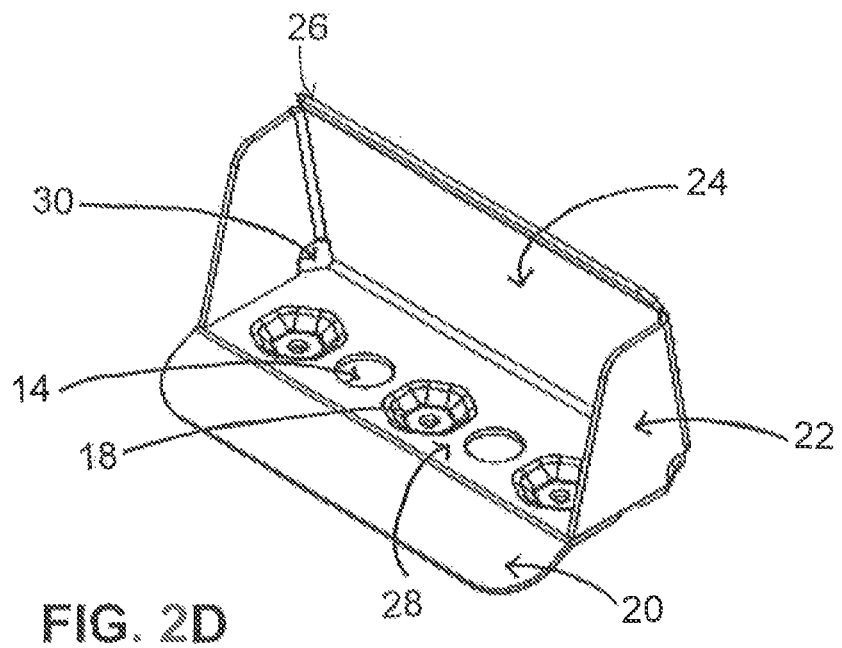
FIG. 2D shows a perspective view of one embodiment of a flight of the present disclosure.

FIG. 2D shows a perspective view of one embodiment of a flight of the present disclosure. More particularly, the flight 11 has a food contacting portion 24, two opposed side panels 22, a base 28, and an angled foot portion 20. Alternating embossed areas 18 and through holes 14 are formed within the base 28. Additionally, a cut away, or vent, section 30 is formed in a corner region where the base 28, the side panel 22, and the food contacting portion 24 of the flight 11 meet. The flight in this embodiment also has an angled top portion 26 located along the top of the food contacting portion 24. This angled top portion 26, if provided, adds strength and/or stability to the flight.

Figure 3A:
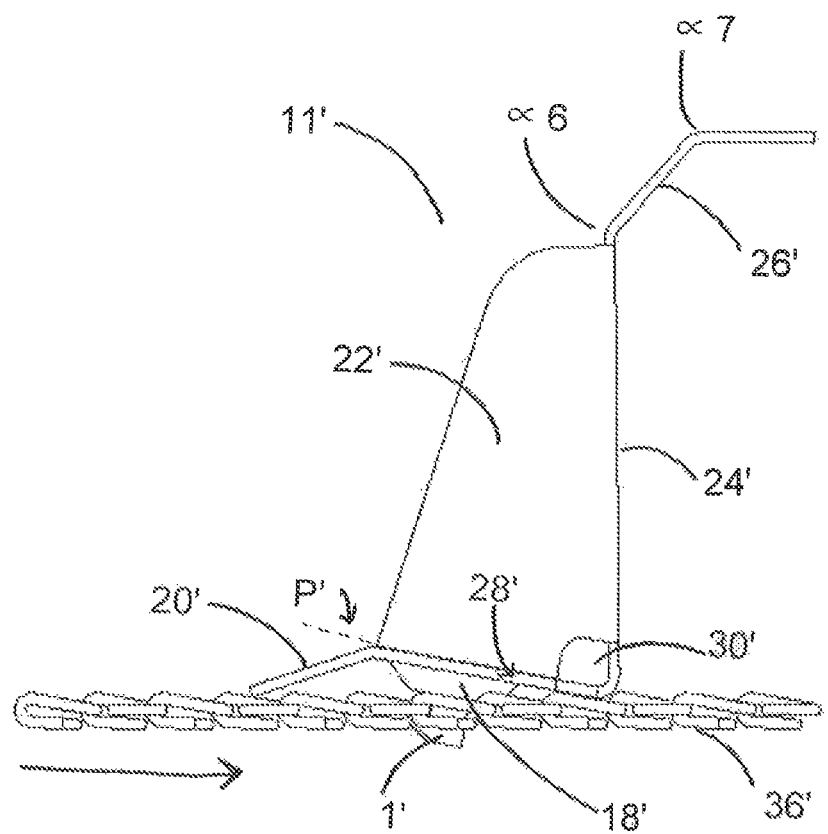
FIG. 3A shows a side view of another embodiment of a flight of the present disclosure showing a J-fastener and a portion of a compact-grid conveyor belt.

FIG. 3A shows a side view of another embodiment of a flight 11' of the present disclosure showing a J-fastener and a portion of a compact-grid conveyor belt. More specifically, a top edge and a trailing edge of the side panel 22' meet with each other at a rounded corner. The cut-away, or vent, portion 30' may be rounded and be about 6.35 mm tall and about 6.35 mm wide. A range of angles may be used for the angled foot portion so long as it creates minimum contact between the flight and the compact-grid conveyor belt and thus facilitates cleaning of the flighted belt. In this embodiment, the angled top portion 26' has two bends, $\alpha^6$ and $\alpha^7$, to create a cupped flight that is used to carry product up vertical or near vertical inclines, where the food product rests on the surface 24' and is retained, in part, by the angled top portion 26' that is angled in a direction away from the foot portion 20'.

Figure 3B:
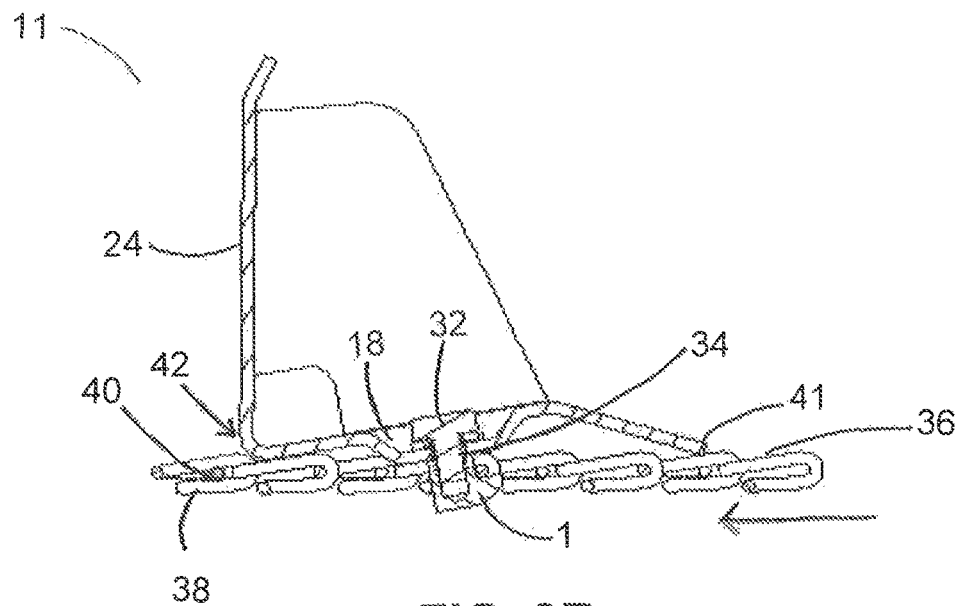
FIG. 3B shows a partial cut away view from the side of one embodiment of a flight of the present disclosure showing a J-fastener and a portion of a compact-grid conveyor belt.

FIG. 3B shows a partial cut away view from the side of one embodiment of a flight 11 of the present disclosure showing the J-fastener and a portion of a compact-grid conveyor belt 36. More particularly, a plurality of fasteners (only one of which is visible in this Figure) is used to attach the flight 11 to the compact-grid conveyor belt 36 using a respective screw 32 and a respective spring washer 34 to couple the flight 11 to each fastener 1. As can be seen in this Figure, the point of attachment is in an embossed area (see, for example, FIG. 2D for a more detailed view). This attachment configuration in combination with the angled foot portion 20 and the angled food contacting portion 24 of the flight 11 provide for flexibility in the direction of travel (as shown by the arrow from right to left). These angled portions better accommodate going around the tail end and head or drive pulleys of the conveyor belt and help to hold food product on surface 24 of flight 11, but also mitigate the possibility that food product will be entrapped under the flight. For example, trailing contact point 41 and leading contact point 42, between the belt 36 and the flights 11, stabilize the flight 11 and prevent forward and backward tipping when loading the conveyor and traveling up an incline. This configuration also promotes ease of cleaning using a high pressure hose and the stainless steel construction.

Still referring to FIG. 3B, the system of flights and fasteners for compact-grid conveyor belts of the present disclosure provide great strength and minimum contacts with the belt to facilitate cleaning. More specifically, a threaded attachment is used to join the J-fastener 1 and the flight 11 to a compact-grid conveyor belt 36. The use of one or more embossed areas 18 on the flight each having a point of attachment provides localized regions of contact with the wires of the compact-grid conveyor belt 36 that are effectively sandwiched between the belt contacting surface 15 of the embossed area 18 and the J-fastener 1.

Figure 4:
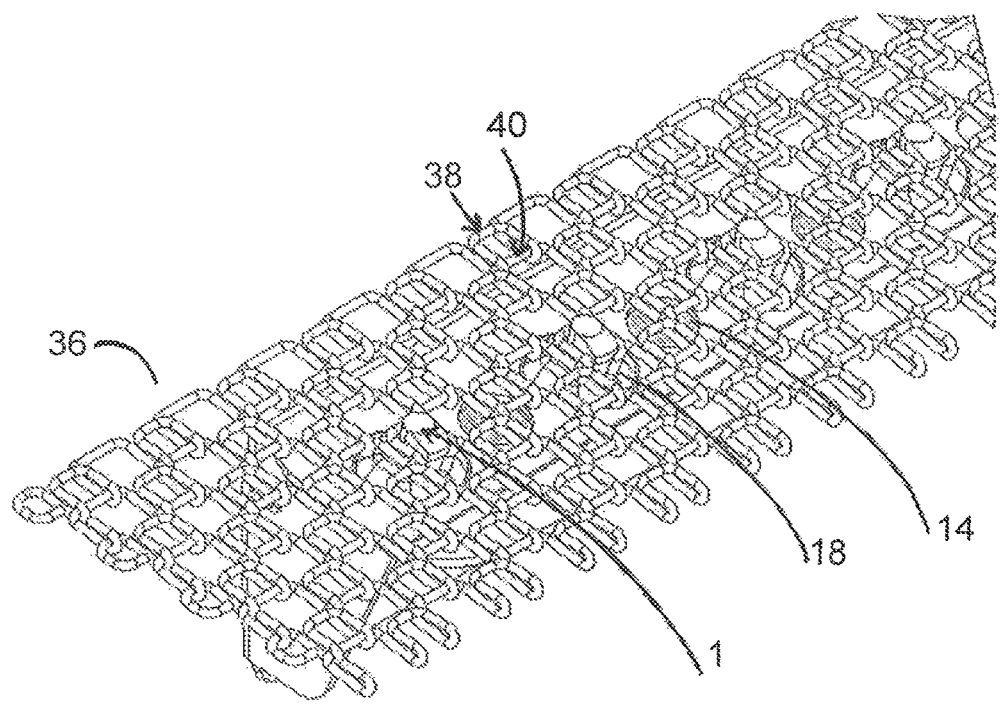
FIG. 4 shows one embodiment of a J-fastener of the present disclosure attached to a flight as viewed from the underside of a compact-grid conveyor belt.

FIG. 4 shows one embodiment of the J-fastener 1 of the present disclosure attached to a flight as viewed from the underside of a compact-grid conveyor belt 36. More specifically, it is possible to see the alternating through holes 14 and embossed areas 18 along the width of the flight. The series of fasteners 1 attach the flight to the compact-grid conveyor belt 36 using screws and washers (not visible in this Figure). The J-fasteners 1 are attached such that the head portion 6 of the J-fastener clamps down on a portion of the compact-grid conveyor belt 36 referred to as the hinge portion 40, and fits in between the hanger portion 38 of the adjacent wire in the compact-grid wire conveyor belt 36. The hinge portion 40 is generally in contact with the junction J when the J-fastener is attached. The belt contacting surface 15 of the embossed area is in contact with the region of the compact-grid wire belt defined by a hanger portion 38 on the adjacent wire, which is clamped down on by the head of the J-fastener. This configuration provides flexibility in the movement of the belt with the attached flight and also provides a secure attachment point that is shielded, in part, by the links of the belt itself. In the areas around and between the embossed areas 18 there is clearance between the belt 36 and the flight to greatly facilitate cleaning of the system.

Figure 5A:
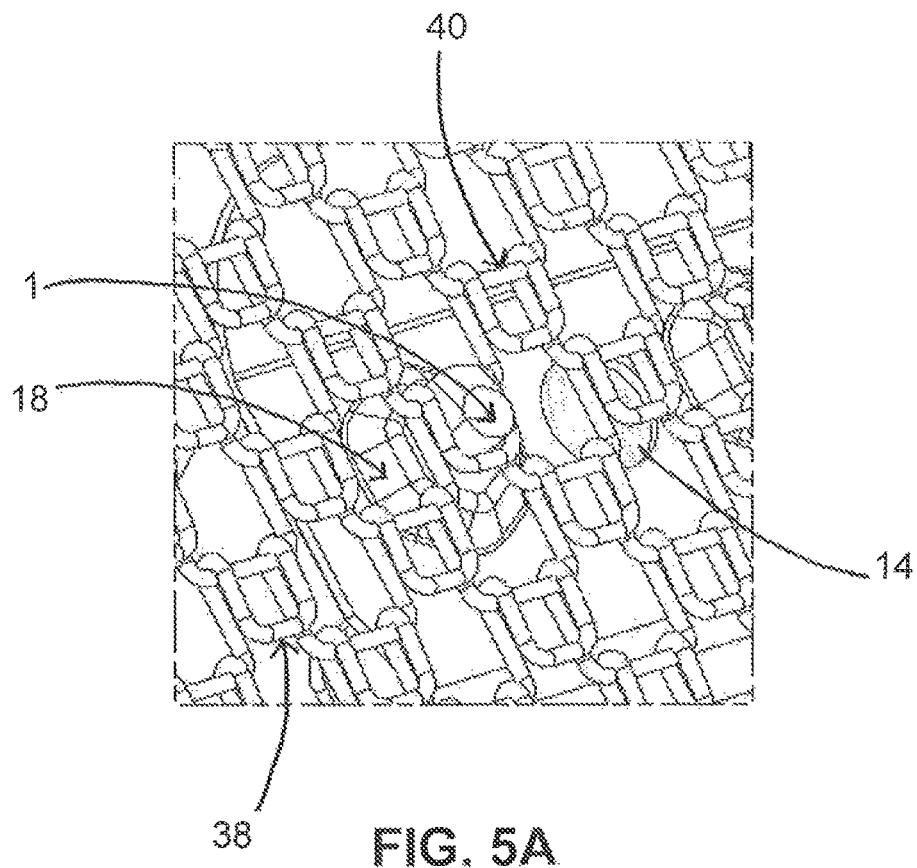
FIG. 5A shows one embodiment of a J-fastener of the present disclosure attached to a flight as viewed from the underside of a compact-grid conveyor belt.

FIG. 5A shows one embodiment of the J-fastener of the present disclosure attached to a flight as viewed from the underside of a compact-grid conveyor belt similar to FIG. 4. More specifically, it is possible to view the embossed area 18 and the through holes 14 alternating along the width of the flight. As described above, the J-fasteners are clamped onto the hinge portion 40 of a first wire and are effectively surrounded by the hanger portion 38 of an adjacent wire in the compact-grid conveyor belt. The belt contacting surface 15 of the embossed area 18 contacts a localized region of the belt (the hanger portion 38 of an adjacent wire in the compact-grid conveyor belt) while other adjacent areas such as those with through holes contain large gaps/clearances between the flight and the belt 36 to allow for cleaning of the system and added flexibility in movement when the belt is in operation.

Figure 5B:
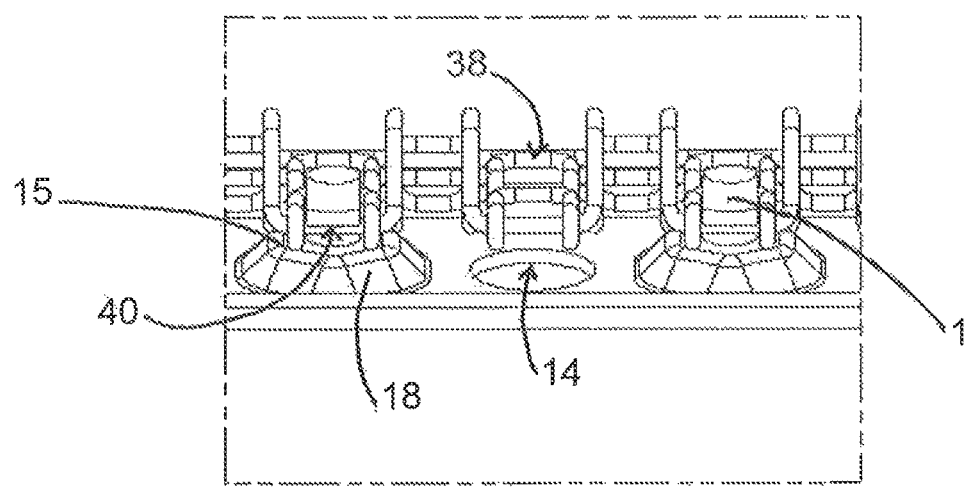
FIG. 5B shows one embodiment of a J-fastener of the present disclosure attached to a flight as viewed from the back of a compact-grid conveyor belt with the belt inverted.

FIG. 5B shows one embodiment of the J-fastener 1 of the present disclosure attached to a flight as viewed from the back of a compact-grid conveyor belt 36 with the belt inverted. This view provides a clear view of the embossed area 18 with the belt contacting surface 15, the through holes 14, and the clamping mechanism of the fastener 1 on to the hinge portion 40 of the compact-grid conveyor belt 36. Here, it is also easy to see how this configuration facilities cleaning by minimizing areas where food product could be trapped.

Figure 6C:
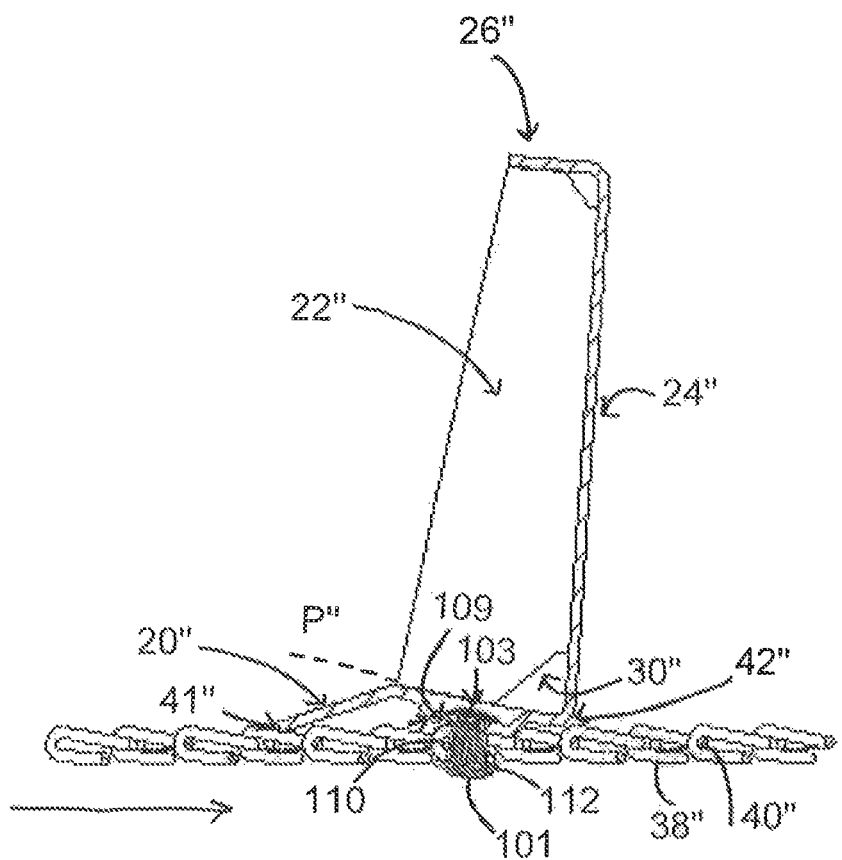
FIG. 6C shows a partial cut away view from the side of yet another embodiment of a flight of the present disclosure showing one embodiment of a rivet-type fastener as shown in FIG. 6A and FIG. 6B and a portion of a compact-grid conveyor belt.

FIG. 6A shows a side view of another embodiment of a fastener of the present disclosure. FIG. 6B shows a bottom view of the rivet-type fastener of the present disclosure shown in FIG. 6A. More specifically, the rivet-type fastener 100 has a first, or tail, end 103 and a head, or second, end 101. The head end 101 is typically rounded, but can be a flat head, a truss, an oval, or the like. The second or head end is positioned underneath the compact-grid conveyor belt when in use, as can be seen in at least FIG. 6C. The first, or tail, end 103, when installed, is deformed, or bucked, to create a flange (as shown in FIG. 6C) for retaining the flight on the compact-grid conveyor belt. An inner diameter 102 defines an area 107 that, in certain other embodiments, can be threaded to accommodate a retaining screw. A first outer diameter 104 defines a first portion 109 of the rivet-type fastener located at the tail end 103. This first portion 109 is sized to fit through the fastener attachment point 12 located within an embossed area 18. See, for example, FIG. 6C. A second outer diameter 106 defines a second portion 110 of the rivet-type fastener, which is sized to fit within a link of a compact-grid conveyor belt. The transition for the first diameter to the second diameter also acts as a stop against the embossed area 18. See, for example, FIG. 6C. A third portion 112 is defined by a third outer diameter 108, which forms the rim of the head portion of the fastener 100 and located at the head end 101, of the rivet-type fastener. As noted previously, the head of the fastener can be shaped as an oval, a truss, a flat head, or the like. In some embodiments, the first, or head, end of the fastener has a rounded top and/or rounded rim.

FIG. 6C shows a partial cut away view from the side of yet another embodiment of a flight of the present disclosure showing a fastener as shown in FIG. 6A and FIG. 6B and a portion of a compact-grid conveyor belt. This embodiment of the flight 11" of the present disclosure shows a rivet-type fastener and a portion of a compact-grid conveyor belt. More particularly, a plurality of fasteners (only one of which is visible in this Figure) is used to attach a flight to the compact-grid conveyor belt. As can be seen in this Figure, the point of attachment is in an embossed area 18" (see, for example, FIG. 2D for a more detailed view). This attachment configuration in combination with the angled foot portion 20" and the angled food contacting portion 24" of the flight 11" provide for flexibility in the direction of travel (as shown by the arrow from left to right). These angled portions better accommodate going around the tail end and head or drive pulleys of the conveyor belt and help to hold food product on surface 24" of flight 11", but also mitigate the possibility that food product will be entrapped under the flight. For example, trailing contact point 41 and leading contact point 42, between the belt (38", 40") and the flights 11", stabilize the flight 11" and prevent forward and backward tipping when loading the conveyor and traveling up an incline. This configuration also promotes ease of cleaning using a high pressure hose and the stainless steel construction.

Still referring to FIG. 6C, the system of flights and fasteners for compact-grid conveyor belts of the present disclosure provide great strength and minimum contacts with the belt to facilitate cleaning. In this embodiment of the flight 11", an angled top portion 26" is angled toward the foot portion 20" to such a degree as to create a side panel 22" that is surrounded on three of the four sides. This provides additional strength in the flight 11". This embodiment of the fastener 100 is formed of metal, which is capable of being deformed, or bucked, to grip around the embossed area 18" once inserted through a section of the compact-grid conveyor belt. The various flights and fasteners described herein can be used interchangeably depending on the particular application.

In FIG. 6C, the second, or head, end 101 is positioned on the underside of the belt, when in use. The second portion of the fastener 110 is surrounded by links of the conveyor belt and the first section 109 passes through the fastener attachment point 12" of the embossed area 18" and is then deformed, or bucked, at the first, or tail, end 103 to secure and retain the flight on the conveyor belt. The use of one or more embossed areas 18" on the flight 11" each having a point of attachment 12" provides localized regions of contact with the wires of the compact-grid conveyor belt that are effectively sandwiched between the belt contacting surface 15" (not shown) of the embossed area 18" and the fastener 100.

Referring to FIG. 7A, a front view of a conventional drive sprocket 50 is shown. More particularly, the drive sprocket 50 has two rows of teeth 52 that are spaced apart. This area between the teeth 54 is not deep, but is shallow. Here, the teeth merely need to be long enough to engage with the belt to propel is forward. FIG. 7B shows a side view of the conventional drive sprocket 50 where the various teeth 52 can be seen in profile.

FIG. 8A shows a front view of one embodiment of a sprocket according to the present disclosure. More specifically, a drive sprocket 60 for use with the fasteners and the flights of the present disclosure is shown. The drive sprockets 60 have two rows of teeth 64 spaced apart by a grooved area 66. The grooved area 66 between the two rows of teeth 64 has a depth D' that is sized to accommodate the fasteners described herein. This depth is greater than that of traditional sprockets. In some applications, a guide sprocket 62 is also used with the system of the present disclosure.

FIG. 8B shows a side view of one embodiment of a drive sprocket 60 of the present disclosure with one embodiment of the flight 11 and J-type fastener 1 of the present disclosure. In FIG. 8B, a partial cutaway shows the depth required by the fastener 1 with respect to the teeth 64 of the sprocket. The flight 11 is attached to the compact-grid conveyor belt 36 using a respective screw 32 and a respective spring washer 34 for each respective fastener 1. In FIG. 8B it is possible to see the sprocket teeth 64 and the teeth of the guide sprocket 62 in profile. An arrow represents the direction of travel for the compact-grid conveyor belt 36 and the flight 11 as the sprocket 60 rotates during operation. The grooved sprockets are also useful for rivet-type fasteners and the variety of flights contemplated by this disclosure. In some embodiments, the drive sprockets may have two or more rows of teeth with grooves located in between one or more of the two or more rows of teeth.

Figure 9:
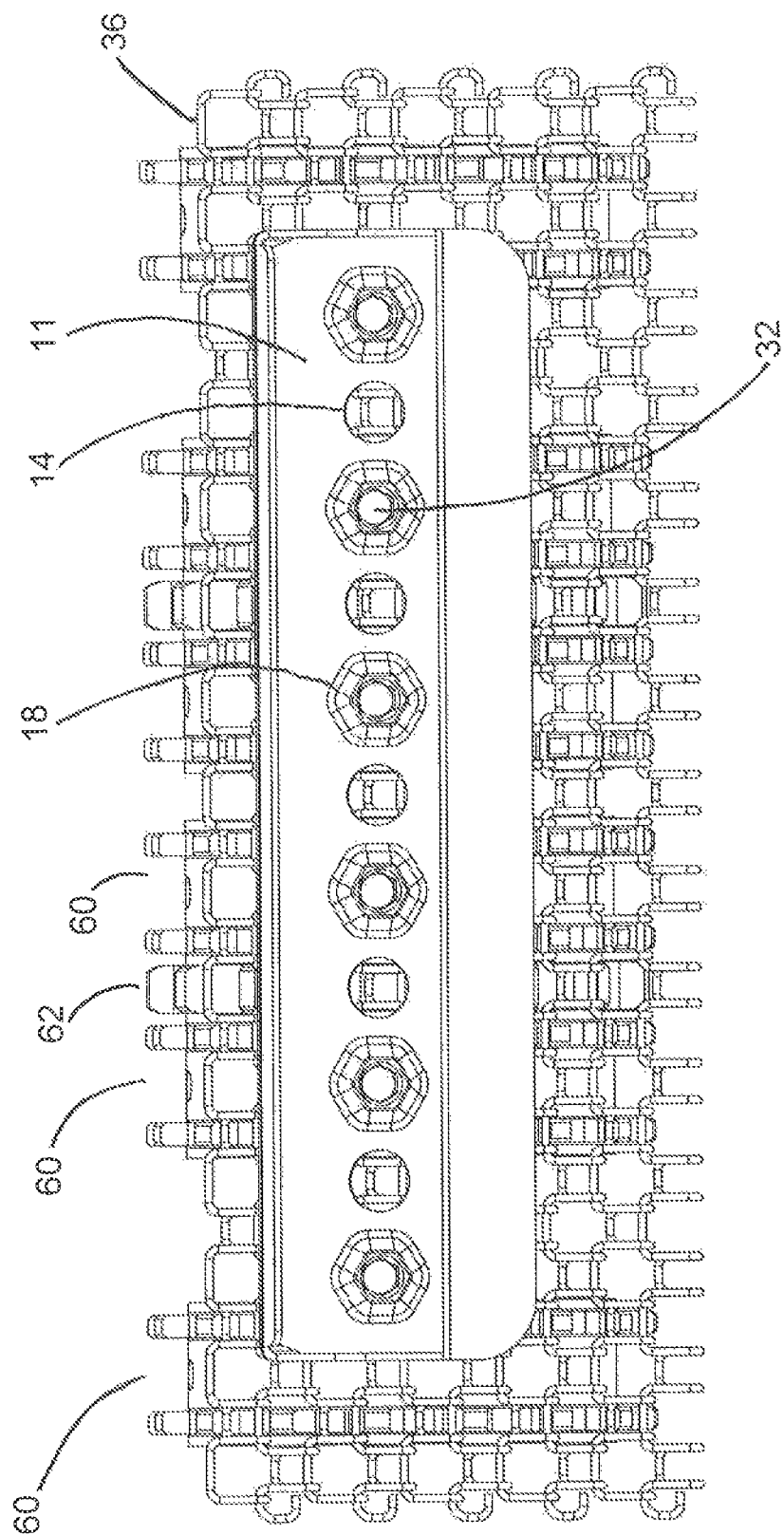
FIG. 9 shows a top view of one embodiment of a flight mounted to a compact-grid conveyor belt according to the principles of the present disclosure.

FIG. 9 shows a top view of one embodiment of the flight 11 mounted to the compact-grid conveyor belt 36 according to the principles of the present disclosure. There, it is possible to see one embodiment of the system where the drive sprockets 60 are oriented across the width of the compact-grid conveyor belt 36 to provide consistent tension and control of the conveyor belt 36 when in use. The flight 11 is designed to have alternating through holes 14 and embossed areas 18 for mounting the flight 11 to the compact-grid conveyor belt 36 using fasteners (not show from this angle), In some cases, the fasteners are attached using screws 32. The spacing of the alternating through holes 14 and embossed areas 18 are such that either a guide sprocket 62 or an open space aligns with the through holes, while the drive sprockets 60 with the corresponding grooved area 66 are aligned with the fasteners.

Conventional sprockets 50 lack a deep groove between the two rows of teeth. In the drive sprockets 60 of the present disclosure, there are deep grooves that line up with the fasteners. In some embodiments, the attachment points are intentionally patterned to occur about 40 mm apart so they will always line up with the deep grooves in the drive sprockets 60 when a guide sprocket 62 is placed between them. The spacing may vary for different applications according to the principles of the present disclosure. With this feature, one can reliably pack more drive components along the width of a belt without worrying about alignment. When the system is installed, all of the drive sprockets include the deep groove feature regardless of their position in the layout. This is done for two reasons: 1) it is more economical to make only one type of sprocket, and 2) there is no chance of the customer mixing up sprocket locations and using a non-grooved sprocket where a grooved sprocket is needed.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A fastening system for flights for use with compact-grid conveyor belts comprising,
    a flight, comprising
        a base defining a plane and having a leading edge and an opposing trailing edge, where the leading and trailing edges are spaced apart and have alternating through holes and embossed areas positioned therebetween along a width of the flight as defined by a first side and a second side;
        a product contacting portion extending upward from the leading edge;
        an angled foot portion extending out and down with respect to the leading edge of the plane of the base; and
        a pair of side panels linking the product contacting portion to the base at the first side and at the second side;
        each of the embossed areas extending downward out of the plane of the base to provide a fastener attachment point therein for attaching the flight to a compact-grid conveyor belt, the compact-grid conveyor belt having a plurality of hinge portions and a plurality of hanger portions, where the hanger portions on a first wire engage with hinge portions of an adjacent wire to form a plurality of links in the compact-grid conveyor belt; and
    a rivet-type fastener comprising,
        a tail end being deformable to create a rivet for attaching the flight to the compact-grid conveyor belt;
        a first portion having a first outer diameter extending from the first end to a second portion, where the first portion is sized to fit through the fastener attachment point of the flight;
        the second portion having a second outer diameter being located between the first portion and a head end, where the second portion is sized to fit through one of the plurality of links in the compact-grid conveyor belt, but not through the fastener attachment point of the flight; and
        the head end having a third outer diameter, wherein the third outer diameter is larger than a space defined by one of the plurality of links in the compact-grid conveyor belt.

2. The fastening system of claim 1, wherein the product contacting surface has a top edge that is angled in the direction of the trailing edge.

3. The fastening system of claim 1, wherein the product contacting surface has a top edge that is angled in the direction of the leading edge to form a cupped flight.

4. The fastening system of claim 1, wherein the flight further comprises side vents located where the base, side panels, and product contacting portion meet.

5. The fastening system of claim 1, wherein the angled foot portion is angled downwardly away from the plane defining the base.

* * * * *